United States Patent
Morgan et al.

(10) Patent No.: US 8,217,772 B2
(45) Date of Patent: Jul. 10, 2012

(54) AUTOMATED GEO-FENCE BOUNDARY CONFIGURATION AND ACTIVATION

(75) Inventors: Gerald A. Morgan, Littleton, CO (US); Stanley G. Schwarz, Littleton, CO (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 0 days.

(21) Appl. No.: 13/364,662

(22) Filed: Feb. 2, 2012

(65) Prior Publication Data

US 2012/0126998 A1   May 24, 2012

Related U.S. Application Data

(63) Continuation of application No. 13/215,732, filed on Aug. 23, 2011, now Pat. No. 8,164,431, which is a continuation of application No. 12/333,904, filed on Dec. 12, 2008, now Pat. No. 8,018,329.

(51) Int. Cl.
  *B60R 25/10* (2006.01)
(52) U.S. Cl. .............. 340/426.19; 340/426.18; 340/5.72
(58) Field of Classification Search ............. 340/426.19, 340/425.5, 426.22, 426.18, 426.2, 426.1, 340/426.36, 539.13, 5.72, 5.1, 5.2, 5.61; 701/201, 202, 207, 213
See application file for complete search history.

(56) References Cited

U.S. PATENT DOCUMENTS

| | | |
|---|---|---|
| 4,335,370 A | 6/1982 | Scalley et al. |
| 4,624,578 A | 11/1986 | Green |
| 4,688,026 A | 8/1987 | Scribner et al. |
| 4,700,296 A | 10/1987 | Palmer, Jr. et al. |
| 5,014,206 A | 5/1991 | Scribner et al. |
| 5,132,968 A | 7/1992 | Cephus |
| 5,490,200 A | 2/1996 | Snyder et al. |
| 5,510,780 A | 4/1996 | Norris et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 6,025,774 A | 2/2000 | Forbes |
| 6,026,922 A | 2/2000 | Horton |
| 6,157,317 A | 12/2000 | Walker |

(Continued)

FOREIGN PATENT DOCUMENTS

EP   1557807   7/2005

(Continued)

OTHER PUBLICATIONS

Schwarz et al. Office Action dated Aug. 21, 2009; U.S. Appl. No. 11/349,523, filed Feb. 7, 2006, p. 18.

(Continued)

*Primary Examiner* — Toan N Pham
(74) *Attorney, Agent, or Firm* — Mark E. Scott; Conley Rose, P.C.

(57) ABSTRACT

A geo-fence is defined and established automatically based on a current location of an asset along with some range or distance, avoiding the need for a user to manually specify a location by drawing a perimeter, specifying a point location, or by any other means. Once established, the geo-fence can be activated so as to notify the owner of the asset and/or some other entity of movement of the asset beyond the boundary specified by the geo-fence. In one embodiment, the geo-fence can be automatically activated upon certain conditions, or can be manually activated, or any combination thereof.

20 Claims, 5 Drawing Sheets

U.S. PATENT DOCUMENTS

| | | | |
|---|---|---|---|
| 6,195,648 | B1 | 2/2001 | Simon et al. |
| 6,249,217 | B1 | 6/2001 | Forbes |
| 6,278,936 | B1 | 8/2001 | Jones |
| 6,380,848 | B1 | 4/2002 | Weigl et al. |
| 6,429,773 | B1 | 8/2002 | Schuyler |
| 6,489,897 | B2 | 12/2002 | Simon |
| 6,587,739 | B1 | 7/2003 | Abrams et al. |
| 6,611,201 | B1 | 8/2003 | Bishop et al. |
| 6,611,686 | B1 | 8/2003 | Smith et al. |
| 6,665,613 | B2 | 12/2003 | Duvall |
| 6,714,859 | B2 | 3/2004 | Jones |
| 6,717,527 | B2 | 4/2004 | Simon |
| 6,741,927 | B2 | 5/2004 | Jones |
| 6,804,606 | B2 | 10/2004 | Jones |
| 6,812,829 | B1 | 11/2004 | Flick |
| 6,816,089 | B2 | 11/2004 | Flick |
| 6,816,090 | B2 | 11/2004 | Teckchandani et al. |
| 6,828,692 | B2 | 12/2004 | Simon |
| 6,870,467 | B2 | 3/2005 | Simon |
| 6,873,824 | B2 | 3/2005 | Flick |
| 6,888,495 | B2 | 5/2005 | Flick |
| 6,917,853 | B2 | 7/2005 | Chirnomas |
| 6,924,750 | B2 | 8/2005 | Flick |
| 6,950,807 | B2 | 9/2005 | Brock |
| 6,952,645 | B1 | 10/2005 | Jones |
| 6,961,001 | B1 | 11/2005 | Chang et al. |
| 6,972,667 | B2 | 12/2005 | Flick |
| 7,005,960 | B2 | 2/2006 | Flick |
| 7,015,830 | B2 | 3/2006 | Flick |
| 7,031,826 | B2 | 4/2006 | Flick |
| 7,031,835 | B2 | 4/2006 | Flick |
| 7,053,823 | B2 | 5/2006 | Cervinka et al. |
| 7,061,137 | B2 | 6/2006 | Flick |
| 7,091,822 | B2 | 8/2006 | Flick et al. |
| 7,123,128 | B2 | 10/2006 | Mullet et al. |
| 7,133,685 | B2 | 11/2006 | Hose et al. |
| 7,149,623 | B2 | 12/2006 | Flick |
| 7,205,679 | B2 | 4/2007 | Flick |
| 7,224,083 | B2 | 5/2007 | Flick |
| 7,266,507 | B2 | 9/2007 | Simon et al. |
| 7,323,982 | B2 | 1/2008 | Staton et al. |
| 7,327,250 | B2 | 2/2008 | Harvey |
| 7,389,916 | B2 | 6/2008 | Chirnomas |
| 7,561,102 | B2 | 7/2009 | Duvall |
| 7,873,455 | B2 * | 1/2011 | Arshad et al. ................... 701/50 |
| 8,018,329 | B2 | 9/2011 | Morgan et al. |
| 2001/0040503 | A1 | 11/2001 | Bishop |
| 2002/0193926 | A1 | 12/2002 | Katagishi et al. |
| 2003/0036823 | A1 | 2/2003 | Mahvi |
| 2003/0151501 | A1 * | 8/2003 | Teckchandani et al. . 340/426.19 |
| 2004/0088345 | A1 | 5/2004 | Zellner et al. |
| 2004/0176978 | A1 | 9/2004 | Simon et al. |
| 2004/0177034 | A1 | 9/2004 | Simon et al. |
| 2004/0203974 | A1 | 10/2004 | Seibel et al. |
| 2004/0204795 | A1 | 10/2004 | Harvey et al. |
| 2005/0017855 | A1 | 1/2005 | Harvey |
| 2005/0033483 | A1 | 2/2005 | Simon et al. |
| 2005/0134438 | A1 | 6/2005 | Simon |
| 2005/0162016 | A1 | 7/2005 | Simon |
| 2005/0270178 | A1 | 12/2005 | Ioli |
| 2006/0059109 | A1 | 3/2006 | Grimes |
| 2006/0108417 | A1 | 5/2006 | Simon |
| 2006/0111822 | A1 | 5/2006 | Simon |
| 2006/0122748 | A1 | 6/2006 | Nou |
| 2006/0136314 | A1 | 6/2006 | Simon |
| 2007/0010922 | A1 | 1/2007 | Buckley |
| 2007/0176771 | A1 * | 8/2007 | Doyle ..................... 340/539.13 |
| 2008/0114541 | A1 | 5/2008 | Shintani et al. |
| 2008/0162034 | A1 | 7/2008 | Breen |

FOREIGN PATENT DOCUMENTS

| | | |
|---|---|---|
| WO | 9616845 | 6/1996 |
| WO | 2007092272 | 8/2007 |
| WO | 2007092287 | 8/2007 |

OTHER PUBLICATIONS

Schwarz et al., Response to Office Action dated Aug. 21, 2009; filed Jan. 21, 2010; U.S. Appl. No. 11/349,523, filed Feb. 7, 2006, 36 p.
Schwarz et al., Final Office Action dated May 4, 2010; U.S. Appl. No. 11/349,523, filed Feb. 7, 2006, 19 p.
Schwarz et al., RCE and Response to Final Office Action dated May 4, 2010, filed Jul. 12, 2010; U.S. Appl. No. 11/349,523, filed Feb. 7, 2006, 40 p.
Schwarz et al., Office Action dated Oct. 26, 2010; U.S. Appl. No. 11/349,523, filed Feb. 7, 2006, 16 p.
Schwarz et al., Response to Office Action dated Oct. 26, 2010, filed Feb. 21, 2011; U.S. Appl. No. 11/349,523, filed Feb. 7, 2006, 27 p.
Schwarz et al., Final Office Action dated Apr. 28, 2011; U.S. Appl. No. 11/349,523, filed Feb. 7, 2006, 17 p.
Schwarz et al., Preliminary Amendment filed Mar. 16, 2007; U.S. Appl. No. 11/539,292, filed Oct. 6, 2006, 28 p.
Schwarz et al., Office Action dated Jul. 22, 2009; U.S. Appl. No. 11/539,292, filed Oct. 6, 2006, 22 p.
Schwarz et al., Office Action dated May 14, 2010; U.S. Appl. No. 11/539,292, filed Oct. 6, 2006, 13 p.
Schwarz et al., Response to Office Action dated May 14, 2010, filed Jul. 12, 2010; U.S. Appl. No. 11/539,292, filed Oct. 6, 2006, 50 p.
Schwarz et al., Office Action dated Oct. 15, 2010; U.S. Appl. No. 11/539,292, filed Oct. 6, 2006, 13 p.
Schwarz et al., Response to Office Action dated Oct. 15, 2010 filed Feb. 15, 2011; U.S. Appl. No. 11/539,292, filed Oct. 6, 2006, 36 p.
Schwarz et al., Final Office Action dated May 26, 2011; U.S. Appl. No. 11/539,292, filed Oct. 6, 2006, 16 p.
Gordon*Howard Associates, Inc., International Search Report and Written Opinion of the International Searching Authority dated Nov. 29, 2007 in PCT Patent Application No. PCT/US07/02816, 6 p.
Gordon*Howard Associates, Inc., International Search Report and Written Opinion of the International Searching Authority dated Dec. 4, 2007 in PCT Patent Application No. PCT/US07/02840, 6 p.
On Time Payment Protection Systems, printed Jan. 2, 2004 from www.ontime-pps.com/how.html.
Aircept Products, printed Jan. 2, 2004 from www. aircept. com/products.html.
How PayTeck Works, printed Jan. 2, 2004 from www. payteck.cc/aboutpayteck.html.
Article: "Pager Lets You Locate Your Car, Unlock and Start It", published Dec. 10, 1997 in USA Today.
Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published, May 18, 1998.
Secure Your Credit & Secure Your Investment (Pay Teck advertisement), printed Jan. 2, 2004 from www. payteck.cc.
iMetrik Company Information, printed Dec. 21, 2006 from imetrik.com.
About C-CHIP Technologies, printed Dec. 21, 2006 from www.c-chip.com.
Hi-Tech tools to solve traditional problems, printed Dec. 21, 2006 from www.c-chip.com.
C-CHIP Technologies Products: Credit Chip 100, Credit Chip 100C, Credit Chip 200, printed Dec. 21, 2006 from www. c-chip.com.
The Credit Chip 100, printed Dec. 21, 2006 from www.c-chip.com.
US 5,699,633, 10/1999, Roser (withdrawn)

* cited by examiner

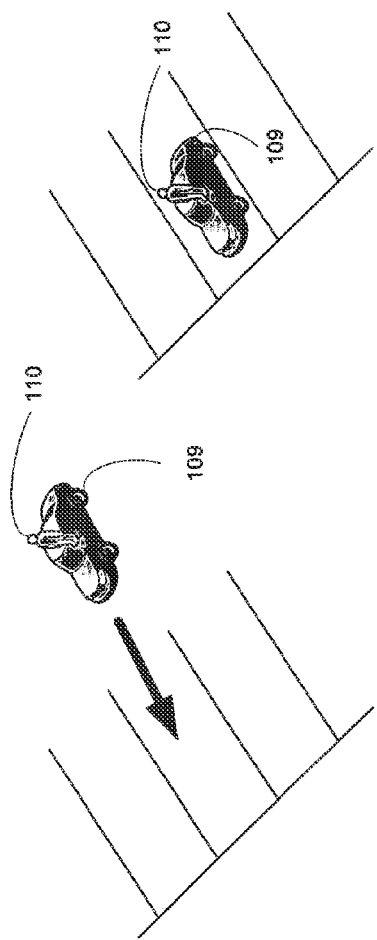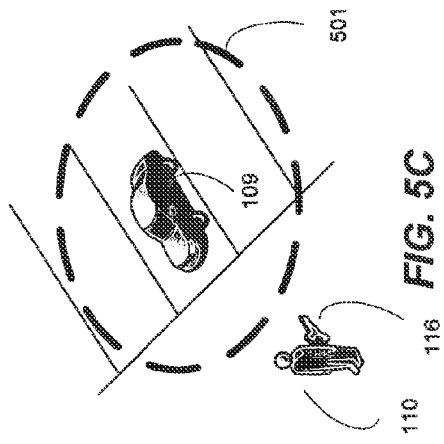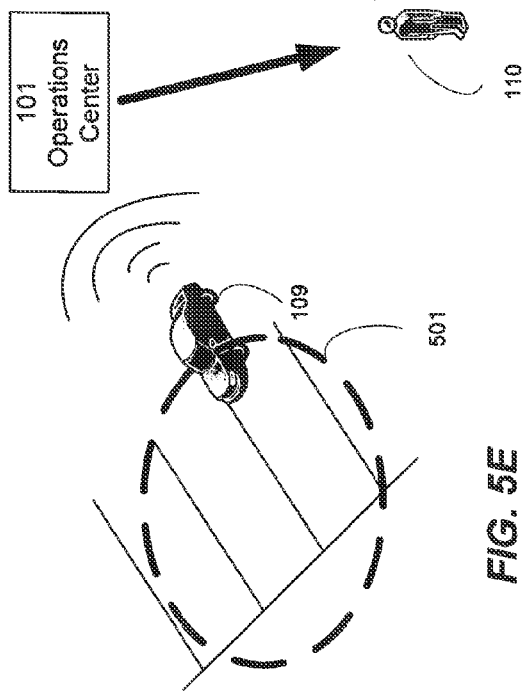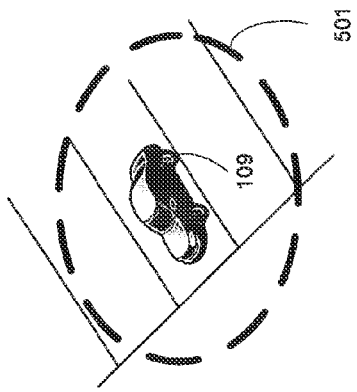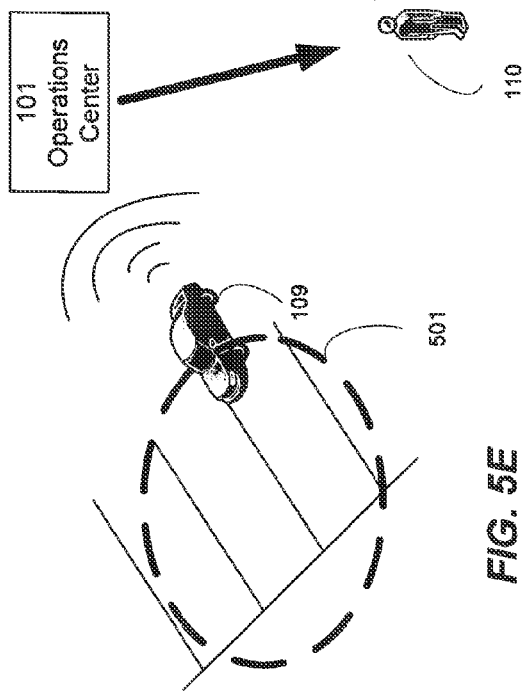
FIG. 5A
FIG. 5B
FIG. 5C
FIG. 5D
FIG. 5E

AUTOMATED GEO-FENCE BOUNDARY CONFIGURATION AND ACTIVATION

CROSS-REFERENCE TO RELATED APPLICATION

This invention is related to U.S. patent application Ser. No. 11/539,292 for "STARTER-INTERRUPT DEVICE INCORPORATING GLOBAL POSITIONING SYSTEM FUNCTIONALITY", filed Oct. 6, 2006, the disclosure of which is incorporated herein by reference. This application is a continuation of U.S. patent application Ser. No. 13/215,732 filed Aug. 23, 2011 (now U.S. Pat. No. 8,164,431) which was a continuation of U.S. patent application Ser. No. 12/333,904 filed Dec. 12, 2008 (now U.S. Pat. No. 8,018,329), both of which are incorporated herein by reference as if reproduced in full below.

FIELD OF THE INVENTION

The present invention relates to location tracking, and more specifically to techniques for specifying and activating a location perimeter (referred to as a geo-fence), and detecting a boundary violation with respect to the specified perimeter.

DESCRIPTION OF THE RELATED ART

Location tracking is a useful mechanism for limiting or preventing theft of assets such as vehicles, and for recovering stolen assets. Various location tracking mechanisms are well known in the art. For example, Global Positioning System (GPS) functionality is a well-known and ubiquitous technique for tracking a vehicle's location. In addition, other mechanisms are known, such as triangulation by cellular telephone signal or other means. Radio frequency identification (RFID) systems are also well known, but are generally suitable only for short-range location tracking.

It is often useful to provide notification when an asset is moved beyond a defined geographic region, referred to herein as a "geo-fence". A geo-fence can be defined by reference to a perimeter, or boundary, surrounding a geo-graphic area. The geographic area can be substantially circular or can be a polygon or any other shape. A monitoring system includes a sensor mounted within the asset to be tracked, a communication link, and an alert notification mechanism. Asset owners and/or other parties can thus be notified when the geo-fence boundary is violated by the asset leaving the boundary. Notification of geo-fence violations in this manner can serve to limit or prevent theft, by promptly alerting an owner and/or law enforcement authorities that the asset has been moved without authorization. Ongoing location tracking can help authorities in their efforts to find a vehicle that has been stolen.

A limitation inherent in many currently available GPS monitoring systems is that they require a user to specify the geo-fence boundary settings, for example by drawing a perimeter on a map. This can be done, for example, on a website designed to facilitate geo-fence configuration. Other systems allow a user to specify a geo-fence by specifying a point location, for example by entering an address or coordinates, and indicating a maximum distance from the specified point. Thus, the user must obtain, by some means, a description or indication as to where the geo-fence should be placed.

Existing techniques for configuring and implementing geo-fences include those describe in, for example: Duvall, U.S. Pat. No. 6,665,613, for "Method of and Apparatus for Dynamically Geofencing Movable Vehicle and Other Equipment and the Like", issued Dec. 16, 2003; and Harvey, U.S. Pat. No. 7,327,250 for "System for Providing a Virtual Vehicle Boundary", issued Feb. 5, 2008.

One limitation of such techniques is that they fail to provide any mechanism for detecting movement of the asset from an arbitrary current location, unless the current location is manually specified by the user. In addition, whether the geo-fence is specified based on a point location or by drawing a perimeter on a map, existing techniques often fail to provide sufficient precision to detect small movements of the asset; in other words, no boundary violation is detected until the asset has moved outside the geo-fence, which may be a undesirably large area because of the inability to manually specify a small area immediately surrounding the asset.

For example, a user may specify a geo-fence surrounding a particular address at which a vehicle will be parked. It may not be feasible or possible to specify the geo-fence specifically or with a fine level of detail, since a) the correlation between address and GPS position may be imperfect, and b) the address may correspond to a large parking lot (such as at an airport), and the user may have no way of knowing where, specifically and within the parking lot, the vehicle is to be parked. Thus, the geo-fence configured by the user may be relatively large. As a consequence, small movements of the vehicle (such as those that remain within the coarse definition of the geo-fence) may go undetected. Such limitations can reduce reliability of the system and impair prompt response to events such as vehicle theft. In addition, current techniques are subject to error, since the user may specify the geo-fence incorrectly. Such error can result in false positives as well as the possibility that theft may go undetected.

Furthermore, existing techniques do not provide any automated means for activating location notification automatically or passively under certain conditions, using a geo-fence derived from a current location of the asset.

Existing techniques do not provide any mechanism for automatically determining the location of a remote asset and establishing a geo-fence or other boundary surrounding the asset based on its current location. Accordingly, existing location tracking techniques are of limited use in detecting movement of assets and of reliably notifying owners and other parties of asset movement.

What is needed is a system and method of location tracking and boundary violation notification that avoids the limitations of the prior art. What is further needed is a system and method that automatically defines a geo-fence based on a current location of an asset. What is further needed is a system and method that is adapted to automatically and/or passively activate boundary violation notification under certain conditions, so as to more reliably provide notification with a minimum of user effort. What is further needed is a system and method by which an owner of an asset can specify conditions in which the owner or some other entity is to be notified if the asset moves outside a geo-fence.

SUMMARY OF THE INVENTION

In various embodiments, the present invention enables automatic geo-fence establishment and activation. According to the present invention, a geo-fence is defined and established based on a current location of an asset, for example using GPS data comprising latitude and longitude along with some predetermined area based on range or distance. In this manner, the user need not manually specify a location by drawing a perimeter, specifying a point location, or by any other means.

Once established, the geo-fence can be activated so as to notify the owner of the asset and/or some other entity of movement of the asset beyond the boundary specified by the geo-fence. In one embodiment, the geo-fence can be automatically activated upon certain conditions, or can be manually activated, or any combination thereof.

For example, in one embodiment, the system and method of the present invention can be used to automatically activate a geo-fence when a driver parks a car and takes a portable Bluetooth-enabled device, such as a cellular telephone or RFID key fob, with him or her. An onboard device can be configured to detect the presence or absence of the portable device; when the vehicle is parked and the portable device is taken away from the vehicle, a geo-fence can be automatically defined and activated. The geo-fence can be defined based on a perimeter surrounding the current position of the vehicle. The onboard device communicates with a central server, for example over a cellular telephone network, to locate the vehicle using GPS to establish the geo-fence.

An automated notification protocol can be established in connection with the geo-fence, so that the driver (and/or some other entity, such as the police department) is automatically alerted if the vehicle is moved outside the geo-fence. For example, in the event the vehicle is moved outside the geo-fence, a boundary violation message can be sent via a cellular telephone network, by SMS text message, by email, instant message, or by any combination of the above. In some embodiments, more complex notification rule sets can be specified, to define the conditions in which a boundary violation message will be sent.

When the driver returns to the vehicle, the onboard device detects the presence of the portable device and deactivates the geo-fence.

In another embodiment, a geo-fence can be activated manually. For example, the geo-fence can be activated when the vehicle ignition is turned off, or when the vehicle is locked, or when the user inputs a command and/or enters a password on a keypad associated with the onboard device, or when the user presses a button on the portable device. In one embodiment, portable device can use Radio Frequency (RF) or infrared (IR) techniques to communicate with the onboard device. The onboard device communicates with a central server, for example over a cellular telephone network, to establish the geo-fence around the vehicle based on its current position.

Similarly, the geo-fence can be deactivated manually, for example by the user turning the ignition on, or by pressing a button on the portable device, or by entering a password on a keypad on the vehicle, or by some other means.

In yet another embodiment, the geo-fence can be activated and/or de-activated without the use of an onboard device at the vehicle. The driver (or other individual) can activate a geo-fence by direct communication with a central server, either by logging on to a web page, or by telephone call, SMS text message, instant message, or by some other means. Upon receiving such an activation message or communication, the central server establishes and activates a geo-fence around the vehicle based on its current position. Upon receiving a de-activation message or communication, the central server deactivates the geo-fence. In this manner, a driver or other individual can control, activate, deactivate, and configure the geo-fence even when he or she is not at the same physical location as the vehicle.

By establishing a geo-fence based on current asset position, the present invention provides much greater reliability as compared with prior art systems. The possibility of user error in specifying the geo-fence is reduced, since the geo-fence boundary is automatically determined rather than manually entered. Geo-fences can be established with much finer granularity, since there is no need to encompass an entire parking lot or other location defined in terms of an address; thus small movements of the asset can be detected and response time can be improved. In addition, the present invention provides mechanisms for passively initiating a geo-fence, for example when a vehicle has been parked or under other conditions, with a minimum of burden on the user/driver.

BRIEF DESCRIPTION OF THE DRAWINGS

FIGS. 5A through 5E depict an example of a sequence of activating a geo-fence and responding to a geo-fence violation, according to an embodiment of the present invention.

DETAILED DESCRIPTION OF THE EMBODIMENTS

In one embodiment, the present invention includes or interfaces with location tracking functionality as described in related to U.S. patent application Ser. No. 11/539,292 for "STARTER-INTERRUPT DEVICE INCORPORATING GLOBAL POSITIONING SYSTEM FUNCTIONALITY", filed Oct. 6, 2006, the disclosure of which is incorporated herein by reference. One skilled in the art will recognize that the present invention can be implemented with or without such location tracking functionality.

For illustrative purposes, the description provided herein sets forth the invention in the context of vehicles. However, one skilled in the art will recognize that the invention can be used in connection with any product.

For purposes of the following description, "vehicle owner", "owner", and "user" are synonymous and can refer to any individual who is interacting with the components of the present invention.

Figure 1:
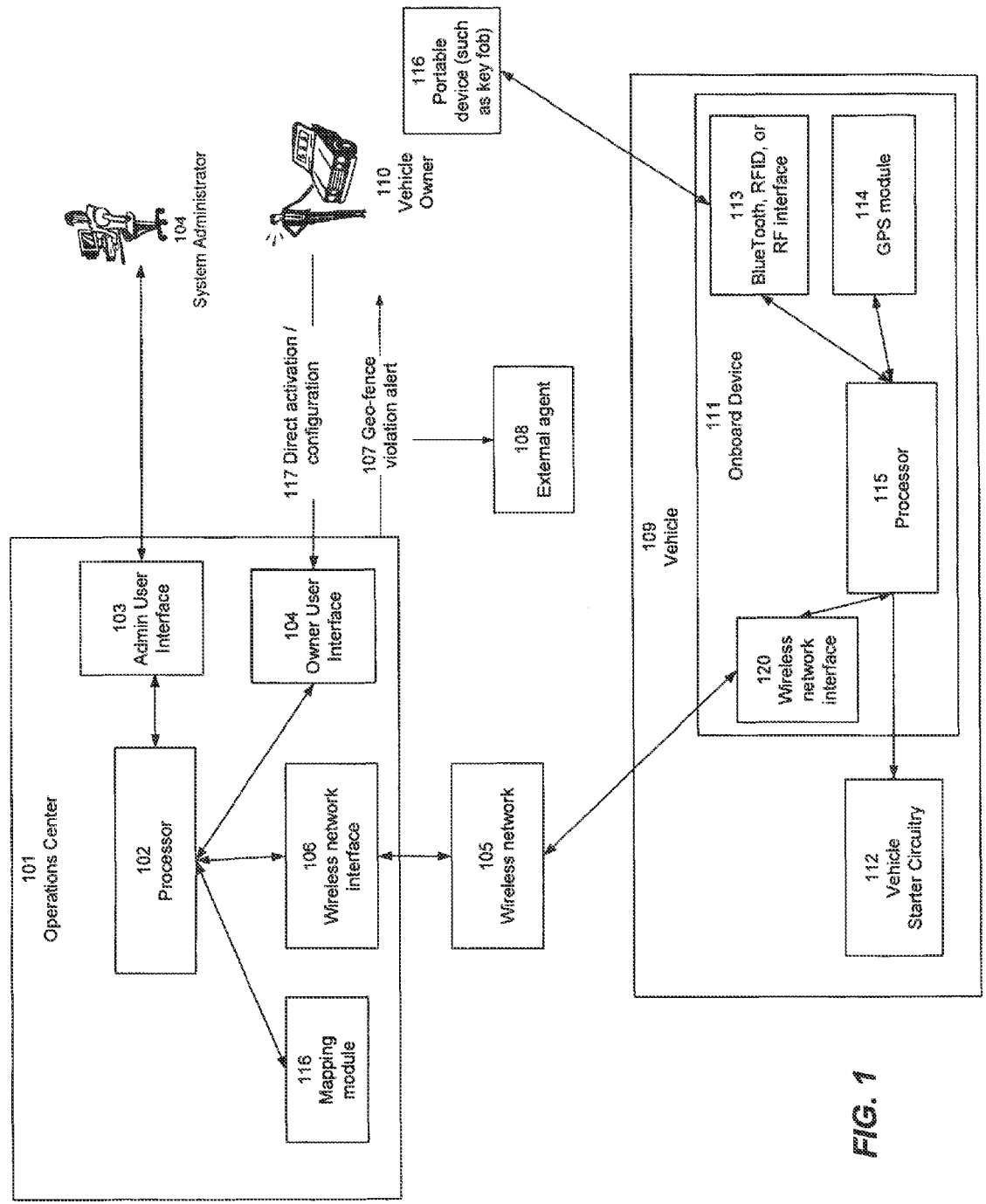
FIG. 1 depicts an overall architecture for an embodiment of the invention.

Referring now to FIG. 1, there is shown a block diagram depicting an overall architecture for an embodiment of the invention.

According to one embodiment onboard device 111 is installed in vehicle 109. Onboard device 111 can be pre-installed or can be an add-on component. In one embodiment, onboard device 111 is connected to vehicle starter circuitry 112 so as to provide the ability to selectively disable vehicle 109 in the event of a geo-fence violation. This connection is optional, and is not an essential characteristic of the invention.

Onboard device 111 includes processor 115 which performs various functions in connection with the operation of the invention. Bluetooth, RFID or RF interface 113 detects signals from portable device 116 (such as a key fob, cellular telephone, or some other device) held by vehicle owner 110. Interface 113 can take any known form for detecting the presence or absence of portable device 116. In one embodiment, as described in more detail below, a geo-fence can be activated in response to the absence of portable device 116, so that the invention activates the geo-fence when owner 110 parks vehicle 109 and walks away.

Onboard device 111 also includes Global Positioning System (GPS) module 114, which uses well-known techniques for determining the position of vehicle 109 by communication with satellites. In one embodiment, GPS module 114 is external to onboard device 111, so that onboard device 111 operates in connection with separate GPS hardware that may be installed in vehicle 109.

Wireless network interface 120 communicates via wireless network 105 or by some other means with operations center 101. Wireless network 105 may be any conventional cellular network, pager network, or other mechanism for transmitting information between vehicle 109 and operations center 101. In one embodiment, operations center 101 includes wireless network interface 106 facilitating communication via network 105.

Operations center 101 contains various components for implementing the present invention. In one embodiment, operations center 101 is situated at some central location. Appropriate communications infrastructure, such as Internet, wireless, and/or telecommunications connectivity is provided, so as to allow operations center 101 to communicate with other elements of the overall system.

Processor 102 at operations center 101 performs many of the functions of the present invention, including controlling the operation of various components of operations center 101. Mapping module 116 performs mapping functions associated with the present invention, including for example determining vehicle 109 movement outside an activated geo-fence, as described in more detail below.

Processor 102 also includes administrator user interface 103 allowing system administrator 104 to control and configure the operation of the system. Processor 102 also includes owner user interface 104 allowing owner 110 to interact with the system, for example to specify conditions in which a geo-fence should be activated, and to specify the type of alerts to be issued in the event of geo-fence boundary violations. As described in more detail below, vehicle owner 110 can also directly activate and/or configure 117 the system via user interface 104.

Operations center 101 issues geo-fence violation alerts 107 under certain conditions, such as when a geo-fence is active and vehicle 109 position is outside the geo-fence. Geo-fence violation alerts 107 can be transmitted using any known communications medium, including email, SMS, instant message, automated telephone call, or the like.

Figure 2:
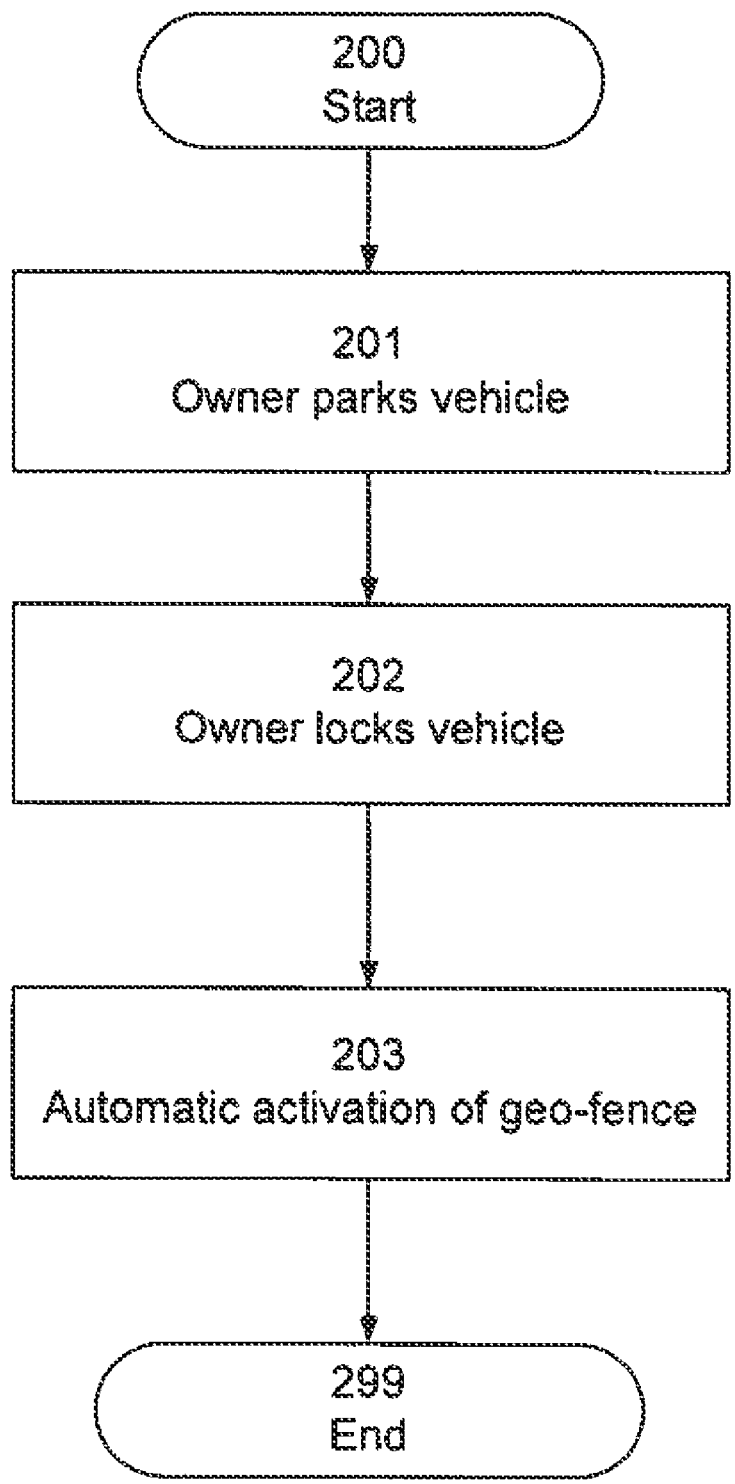
FIG. 2 is a flow diagram depicting an overall method of activating a geo-fence according to an embodiment of the present invention.

Referring also to FIG. 2, there is shown a flow diagram depicting an overall method of activating a geo-fence according to an embodiment of the present invention. Referring also to FIGS. 5A through 5E, there is shown an example of a sequence of activating a geo-fence and responding to a geo-fence violation, according to an embodiment of the present invention. As mentioned above, the invention is described in connection with a technique for activating a geo-fence for a vehicle; however, one skilled in the art will recognize that the invention can be used in connection with any asset, and is not limited to operation with a vehicle.

As shown in FIGS. 5A and 5B, owner 110 parks 201 vehicle 109. Owner 110 locks 202 vehicle 109. The locking step 202 is optional, and can be omitted. Geo-fence 501 is activated 203. In one embodiment, activation 203 of geo-fence 501 takes place automatically in response to vehicle 109 being locked 202. In another embodiment, activation 203 takes place automatically in response to some other trigger event, such as detection that a portable device 116 carried by owner 110 has been moved away from vehicle 109. Proximity of portable device 116 to vehicle 109 can be detected by known techniques that are used for remote keyless entry systems, such as by detecting the presence or absence of a radio frequency signal with a designated, distinct digital identity code associated with a particular portable device 116. In one embodiment, interface 113 located in vehicle 109 (either as part of onboard device 111 or as a separate component) detects the presence or absence of portable device 116.

In another embodiment, activation 203 takes place automatically in response to any other trigger event, including but not limited to: the engine being turned off; the key being removed from the ignition; detection that the vehicle has not moved in some period of time; detection that the vehicle is in a particular location; or the like.

In another embodiment, activation 203 takes place in response to an explicit activation command or operation. For example, owner 110 can press a button on portable device 116 initiating activation 203 of geo-fence 501. Alternatively, owner 110 can press a button on onboard device 111, enter a code on a keypad in vehicle 109, or send a text message, email message, instant message, or other communication directly to operations center 101. Alternatively, owner 110 can visit a website, log in using an authentication mechanism, and indicate that geo-fence 501 should be activated; the website can communicate this command to operations center 101.

In another embodiment, activation 203 takes place at some preset time of day, such as for example between 11 pm and 6 am, unless countermanded by owner 110.

One skilled in the art will recognize that many other trigger events, operations, and mechanisms for initiating activation 203 of geo-fence 501 can be used.

Figure 3:
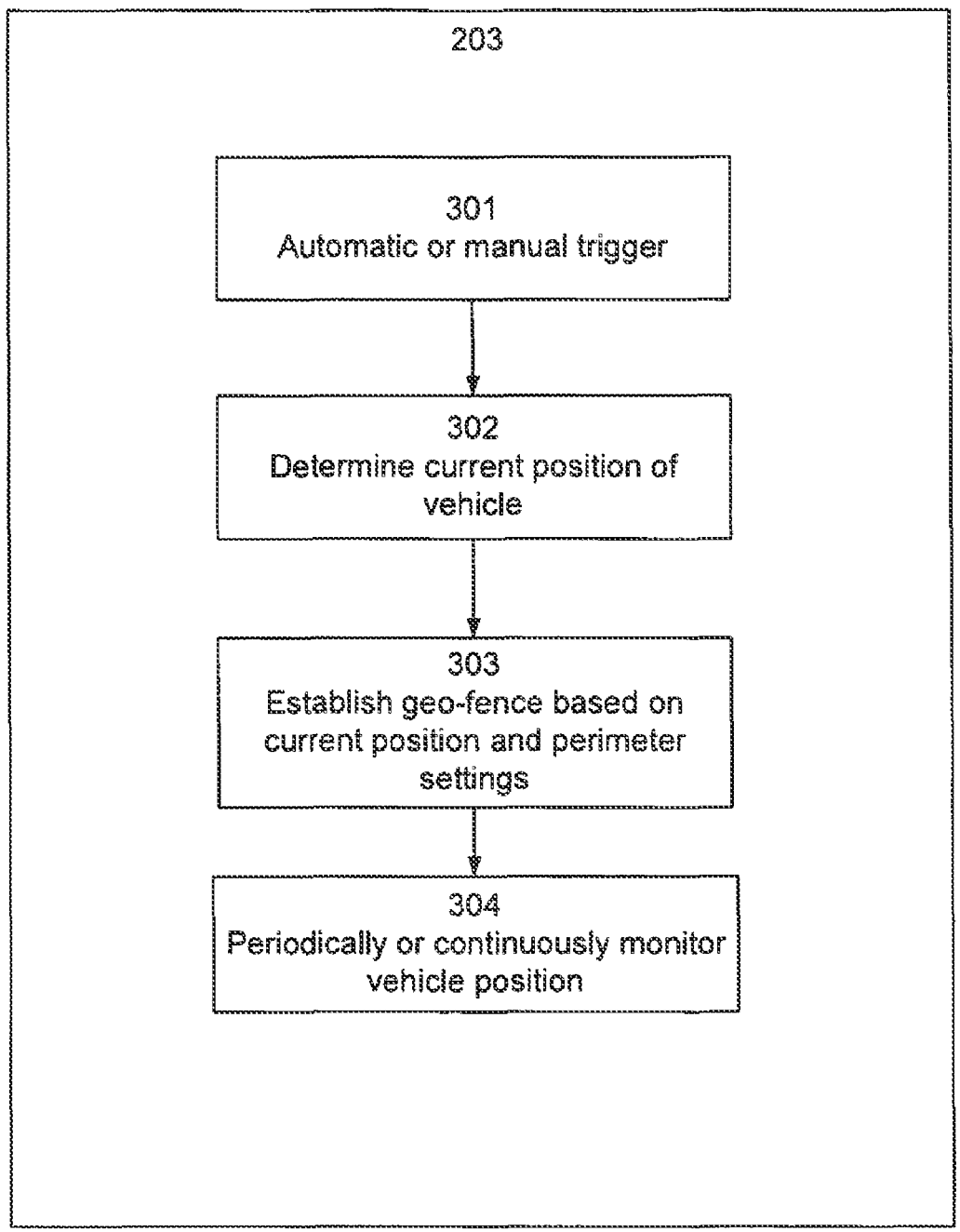
FIG. 3 is a flow diagram depicting a method of establishing a geo-fence based on a current vehicle position, according to an embodiment of the present invention.

Referring also to FIG. 3, there is shown a flow diagram depicting a method of establishing a geo-fence 501 based on a current vehicle 109 position, according to an embodiment of the present invention. Trigger event occurs 301, whether automatic or manual. The system determines 302 the current position of vehicle 109, for example by well-known GPS techniques using GPS module 114. Then, based on the current position and other settings and parameters, the system establishes 303 geo-fence 501.

In one embodiment, the present invention avoids the need for owner 110 or any other individual to manually specify the parameters, bounds, size, or shape of geo-fence 501 or the region defined by geo-fence 501. Rather, geo-fence 501 is established 303 based on the current position of vehicle 109 and, optionally, other factors. For example, in one embodiment, geo-fence 501 is established as a region centered around the current position of vehicle 109 and having a radius according to some predetermined configuration parameter. In one embodiment, geo-fence 501 can have different shape, size, or characteristics depending on various factors, such as but not limited to: owner-defined preferences; system-wide settings; administrator-defined preferences; current location of vehicle 109; geographic considerations; and the like.

FIG. 5D depicts vehicle 109 with geo-fence 501 established and active. In one embodiment, geo-fence 501 is established by processor 115; specifically, vehicle 109 position is determined by signals from GPS module 114, and processor 115 establishes a radius according to some predetermined configuration parameter. In another embodiment, geo-fence 501 is established by operations center 101; specifically, vehicle 109 position is determined by signals from GPS module 114 sent to the operations center 101 via wireless network 105, and processor 102 establishes a radius according to some predetermined configuration parameter. In one embodiment, once geo-fence 501 has been established, the system of the present invention periodically or continuously monitors 304 vehicle 109 position with respect to geo-fence 501. In one embodiment, position monitoring is performed by periodic signals from GPS module 114 to operations center 101 via wireless network 105, so that processor 102 can compare current vehicle 109 position with geo-fence 501 to detect geo-fence violations. In another embodiment, the system of the present invention transmits geo-fence 501 information to vehicle 109 so that a geo-fence violation can be detected locally by onboard device 111 at vehicle 109. Thus, the specific parameters of geo-fence 501 can be stored at operations center 101, or at vehicle 109, or at both locations.

In some embodiments, the system can be configured to receive periodic transmissions from onboard device 111 even when no geo-fence violation has taken place, so that if onboard device 111 is disabled or inoperative, the lack of transmissions can cause an alert to be issued to indicate a possible geo-fence violation. Thus, a thief cannot disable the system by tampering with or destroying onboard device 111.

Figure 4:
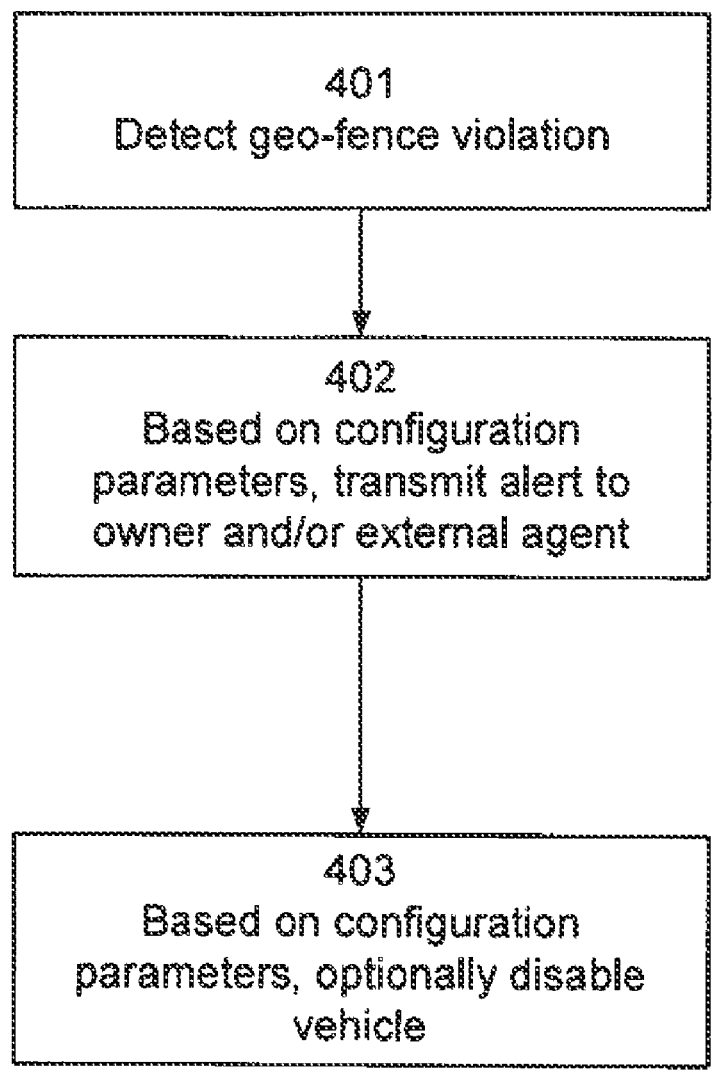
FIG. 4 is a flow diagram depicting a method of responding to a geo-fence violation, according to an embodiment of the present invention.

Referring now to FIG. 4, there is shown a flow diagram depicting a method of responding to a geo-fence violation, according to an embodiment of the present invention. FIG. 5E depicts a geo-fence violation, where vehicle 109 is leaving the area defined by geo-fence 501, for example if it is being stolen. The geo-fence violation is detected 401 in one of several ways. In one embodiment, onboard device 111 has access to the parameters of geo-fence 501 and detects the current position of vehicle 109 via GPS module 114; if the current position is outside geo-fence 501, onboard device 111 sends a signal to operations center 101 via wireless network 105 or by some other means. In another embodiment, the parameters of geo-fence 501 are stored at operations center 101, and onboard device 111 periodically sends a signal with vehicle 109 position to operations center 101 (or sends a signal when its current location has changed by more than some predetermined amount); the comparison between vehicle 109 position and geo-fence 501 takes place at operations center 101 rather than at vehicle 109.

When a geo-fence violation is detected 401, operations center 101 issues one or more alerts according to predefined settings and preferences. For example, operations center 101 can transmit a geo-fence violation alert 107 to owner 110 and/or to an external agent 108 such as a local police department. Transmission of alert 107 can take place across any known communication channel or channels, including for example: a telephone call, an email message, an SMS message, an instant message, or the like. Alert 107 to external agent 108 can be sent over police radio or other mechanisms, if desired. Additional information, such as current vehicle location, speed, description, or the like, can also be transmitted as part of alert 107 so as to assist in recovery of vehicle 109.

In this manner, the system of the present invention provides a mechanism by which vehicle theft can be quickly detected, and appropriate action can be taken promptly.

In one embodiment, onboard device 111 is optionally connected to vehicle starter circuitry 112 so that vehicle 109 can be disabled when a geo-fence violation is detected. Accordingly, based on predefined parameters and/or in response to a command from administrator 104 or owner 110, onboard device 111 can disable vehicle 109. A signal to disable vehicle 109 can be sent from operations center 101 to vehicle, for example via wireless network 105. Alternatively, onboard device 111 can disable vehicle 109 based on local determination of a geo-fence violation, such as in a configuration where geo-fence parameters are stored locally at onboard device 111 in vehicle 109.

The particular conditions in which the vehicle is disabled can be configured in advance by owner 110, or by administrator 104, or by some other party. Alternatively, in one embodiment, when a geo-fence violation alert 107 is received by owner 110 or by external agent 108, the owner 110 or external agent 108 can be given an opportunity to indicate whether vehicle 109 should be immediately disabled. If feasible and if owner 110 or external agent 108 requests disablement, a signal can be sent to onboard device 111 to disable vehicle 109.

Use Cases

Several embodiments can be implemented using the above-described architecture and methods, and variations thereof. The following are three examples of specific use cases including descriptions of specific technologies, protocols and methodologies.

Passive Device-Based Geo-Fence

A communication link such as Bluetooth or RFID is established between a portable device 116 (such as a key fob, cellular telephone, or other device) carried by owner 110 and onboard device 111. When onboard device 111 no longer detects the presence of portable device 116, onboard device 111 establishes a geo-fence. For example, processor 115 can calculate geo-fence coordinates based on a predefined boundary rule stored in processor 115. Alternatively, onboard device 111 can send a message via wireless network 105 to operations center 101 to initiate activation of a geo-fence to lock down vehicle 109 movement. Upon receiving the message, operations center 101 performs a GPS locate for vehicle 109 and calculates geo-fence coordinates based on a predefined boundary rule. Operations center 101 sends a message over wireless network 105 to onboard device 111 including the established geo-fence coordinates. Onboard device 111 is then able to detect geo-fence violations.

If vehicle 109 violates an active geo-fence by leaving the defined region, a boundary violation message is sent over wireless network 105 to operations center 101. Upon receiving the boundary violation message, operations center 101 executes a "Boundary Violation Routine" which sends out boundary violation messages based on a notification rule set for the particular vehicle 109. This may result in notifications to owner 110 and/or external agent 108, as well as possibly sounding a local alarm, and/or disabling vehicle 109.

When onboard device 111 re-establishes connection with portable device 116, onboard device 111 deactivates the programmed geo-fence, allowing vehicle 109 to be moved without triggering a boundary violation.

Active Device-Based Geo-Fence

Owner 110 presses an "activate" button or enters a code on a portable device 116 (such as a key fob or other device such as a cellular telephone). This causes a signal to be sent, for example via Bluetooth or RFID, to onboard device 111, indicating that a geo-fence should be established. For example, processor 115 can calculate geo-fence coordinates based on a predefined boundary rule stored in processor 115. Alternatively, onboard device 111 can send a message via wireless network 105 to operations center 101 to initiate activation of a geo-fence to lock down vehicle 109 movement. Upon receiving the message, operations center 101 performs a GPS locate for vehicle 109 and calculates geo-fence coordinates based on a predefined boundary rule. Operations center 101 sends a message over wireless network 105 to onboard device 111 including the established geo-fence coordinates. Onboard device 111 is then able to detect geo-fence violations.

If vehicle 109 violates an active geo-fence by leaving the defined region, a boundary violation message is sent over wireless network 105 to operations center 101. Upon receiving the boundary violation message, operations center 101 executes a "Boundary Violation Routine" which sends out boundary violation messages based on a notification rule set for the particular vehicle 109. This may result in notifications to owner 110 and/or external agent 108, as well as possibly sounding a local alarm, and/or disabling vehicle 109.

Owner 110 presses a "deactivate" button or enters a code on a portable device 116. Onboard device 111 deactivates the programmed geo-fence, allowing vehicle 109 to be moved without triggering a boundary violation In one embodiment, the activate signal may be sent automatically when owner 110 locks vehicle 109 via portable device 116 (such as a key fob), and the deactivate signal may be sent automatically when owner 110 unlocks vehicle 109 via portable device 116.

Active Cellular-Based Geo-Fence

Owner 110 sends an SMS, text, instant message, or email message from an appropriately enabled device (such as a cellular telephone or PDA) directly to operations center 101 indicating that a geo-fence should be established. This message can be sent when owner 110 is at the vehicle or from any other location.

Upon receiving the message, operations center 101 performs a GPS locate for vehicle 109 and calculates geo-fence coordinates based on a predefined boundary rule. Operations center 101 sends a message over wireless network 105 to onboard device 111 including the established geo-fence coordinates. Onboard device 111 is then able to detect geo-fence violations.

If vehicle 109 violates an active geo-fence by leaving the defined region, a boundary violation message is sent over wireless network 105 to operations center 101. Upon receiving the boundary violation message, operations center 101 executes a "Boundary Violation Routine" which sends out boundary violation messages based on a notification rule set for the particular vehicle 109. This may result in notifications to owner 110 and/or external agent 108, as well as possibly sounding a local alarm, and/or disabling vehicle 109.

Owner 110 sends an SMS, text, instant message, or email message from an appropriately enabled device (such as a cellular telephone or PDA) directly to operations center 101 to deactivate the geo-fence. Again, this message can be sent when owner 110 is at the vehicle or from any other location. Operations center 101 sends a message over wireless network 105 to onboard device 111 to deactivate the geo-fence. Onboard device 111 deactivates the programmed geo-fence, allowing vehicle 109 to be moved without triggering a boundary violation.

One skilled in the art will recognize that the above-described examples of use cases are intended to be illustrative, rather than limiting, of the scope of the claimed invention. In addition, the use cases can be combined, so that activation by one mechanism can be followed by deactivation by another mechanism. For example, the geo-fence can be established via the active cellular-based method, and subsequently deactivated by the passive device-based method.

The above description includes various specific details that are included for illustrative purposes only. One skilled in the art will recognize the invention can be practiced according to many embodiments, including embodiments that lack some or all of these specific details. Accordingly, the presence of these specific details is in no way intended to limit the scope of the claimed invention.

In the specification, certain components of the invention may be described in terms of algorithms and/or steps performed by a software application. In many cases, such descriptions are intended to set forth the invention using representations that are commonly used among those of skill in the arts. Accordingly, any descriptions that refer to algorithms, method steps, functional components, and the like, shall be considered to encompass electrical, magnetic, optical, and/or mechanical signals representing such algorithms, method steps, functional components, such signals being capable of being stored, transmitted, input, output, and/or otherwise manipulated. Reference to these signals as variables, bits, symbols, values, and the like may appear herein and is not intended to limit the scope of the claimed invention in any way.

All such terms, and any similar terms, are to be considered labels only, and are intended to encompass any appropriate physical quantities or other physical manifestations. Any particular naming or labeling of the various modules, protocols, features, and the like is intended to be illustrative; other names and labels can be used.

In addition, various terms such as "processing", "calculating", "determining", "transmitting", or the like, may be used herein. Such terms are intended to refer to processes performed by a software and/or hardware device such as a computer system. Such terms refer to various types of manipulation and/or transformation of physical and/or electronic components such as registers and memories within the device. These physical and/or electronic components typically represent data elements to be transformed, transmitted, and/or output.

Furthermore, the invention can be implemented as a method, system, computer program product, user interface, or any combination thereof.

The present invention also relates to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

The method steps, user interface layouts, displays, and other components described herein can be implemented on any computer, network, or other apparatus capable of performing the functions described. No limitation as to operation on a particular type of system or apparatus is implied. No particular programming language is required; rather, any type of programming language can be used to implement the present invention.

References to "one embodiment" or "an embodiment" indicate that a particular element or characteristic is included in at least one embodiment of the invention. Although the phrase "in one embodiment" may appear in various places, these do not necessarily refer to the same embodiment.

One skilled in the art will recognize that the invention can be practiced according to many embodiments other than those described herein, without departing from the essential characteristics of the present invention. The particular descriptions set forth above are intended to be illustrative examples only, and are not intended to limit the scope of the invention.

What is claimed is:

1. A method comprising:
receiving a signal that indicates operability of an onboard device coupled to a vehicle, the receiving at an operations center and the signal received periodically over a first period of time;

determining absence of receipt of the signal in a second period of time following the first period of time;

issuing an alert responsive to the determining, the alert indicative of at least one selected from the group consisting of: a possible geo-fence boundary violation; tampering with the onboard device; and disablement of the onboard device.

2. The method of claim 1:

wherein prior to receiving the signal, the method further comprises establishing a geo-fence boundary for the vehicle; and wherein receiving further comprises periodically receiving data indicative of position of the vehicle.

3. The method of claim 2:

wherein establishing the geo-fence boundary further comprises establishing the geo-fence boundary by the onboard device based on location of the vehicle; and wherein receiving further comprises receiving data indicative of location of the vehicle relative to the geo-fence boundary.

4. The method of claim 2:

wherein establishing the geo-fence boundary further comprises establishing the geo-fence boundary at the operations center, the establishing based on location of the vehicle; and wherein receiving further comprises receiving data indicative of location of the vehicle.

5. The method of claim 2 wherein establishing the geo-fence boundary further comprises determining the current location by receiving signals from at least one GPS satellite.

6. The method of claim 1 wherein receiving further comprises receiving data indicative of position of the vehicle.

7. The method of claim 1 wherein receiving further comprises receiving data indicative of position of the vehicle relative to a previously established geo-fence.

8. A system comprising:

a wireless network interface configured to receive a signal to activate a geo-fence boundary for a vehicle;

a processor coupled to the wireless network interface, the processor configured to:

receive a signal that indicates operability of an onboard device remotely located from the processor, the onboard device coupled to a vehicle and the signal received periodically over a first period of time;

determine absence of receipt of the signal in a second period of time distinct from and following the first period of time;

issue an alert responsive to the determination, the alert indicative of at least one selected from the group consisting of: a possible geo-fence boundary violation; tampering with the onboard device; and disablement of the onboard device.

9. The system of claim 8 wherein when the processor receives, the processor is further configured to receive data indicative of position of the vehicle.

10. The system of claim 9:

wherein the processor is configured to receive an indication of a geo-fence boundary established by the onboard device; and wherein when the processor receives the processor is configured to receive data indicative of location of the vehicle relative to the geo-fence boundary.

11. The system of claim 9:

wherein the processor is configured to establish a geo-fence boundary, the establishing based on location of the vehicle; and wherein when the processor receives the processor is configured to receive receiving data indicative of location of the vehicle.

12. The system of claim 8 wherein the processor is configured to receive data indicative of location of the vehicle.

13. The system of claim 8 wherein the processor is configured to receive data indicative of location of the vehicle relative to a previously established geo-fence.

14. A method comprising:

receiving a signal indicative of activation of geo-fence monitoring;

determining location of an asset to create a determined location;

establishing a geo-fence boundary based on the determined location;

activate monitoring of the asset within the geo-fence boundary; and thereafter issuing an alert if unable to monitor asset location.

15. The method of claim 14 wherein issuing the alert further comprises at least one selected from the group consisting of: a possible geo-fence boundary violation; tampering with an onboard device; and disablement of an onboard device.

16. The method of claim 14 further comprising, prior to issuing the alert:

receiving a signal that indicates operability of an onboard device coupled to the asset, the receiving at an operations center and the signal received periodically over a first period of time;

determining absence of receipt of the signal in a second period of time following the first period of time.

17. The method of claim 16 wherein receiving the signal further comprises periodically receiving data indicative of position of the asset.

18. The method of claim 17:

wherein establishing the geo-fence boundary further comprises establishing the geo-fence boundary by the onboard device based on location of the asset; and wherein receiving further comprises receiving data indicative of location of the asset relative to the geo-fence boundary.

19. The method of claim 17:

wherein establishing the geo-fence boundary further comprises establishing the geo-fence boundary at the operations center, the establishing based on the determined location; and wherein receiving further comprises receiving data indicative of location of the asset.

20. The method of claim 17 wherein establishing the geo-fence boundary further comprises determining the determined location by receiving signals from at least one GPS satellite.

* * * * *